United States Patent Office 2,939,339
Patented June 7, 1960

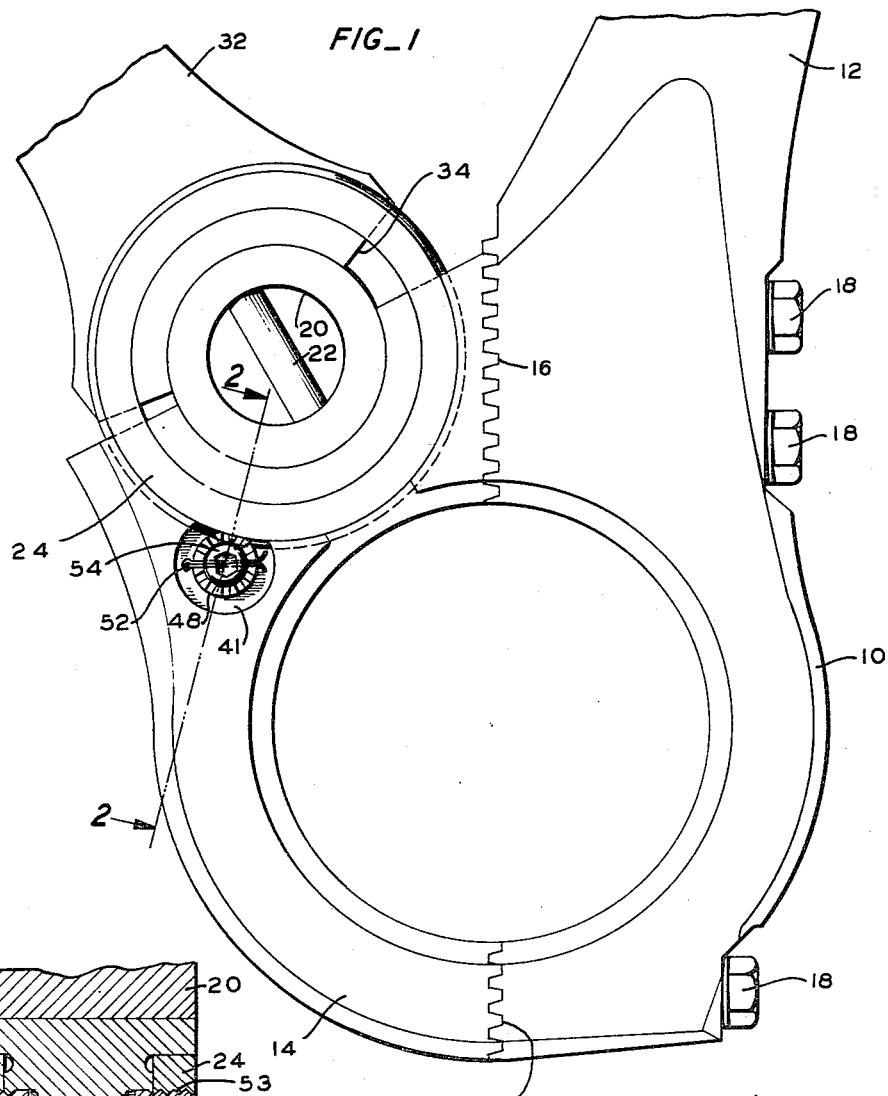

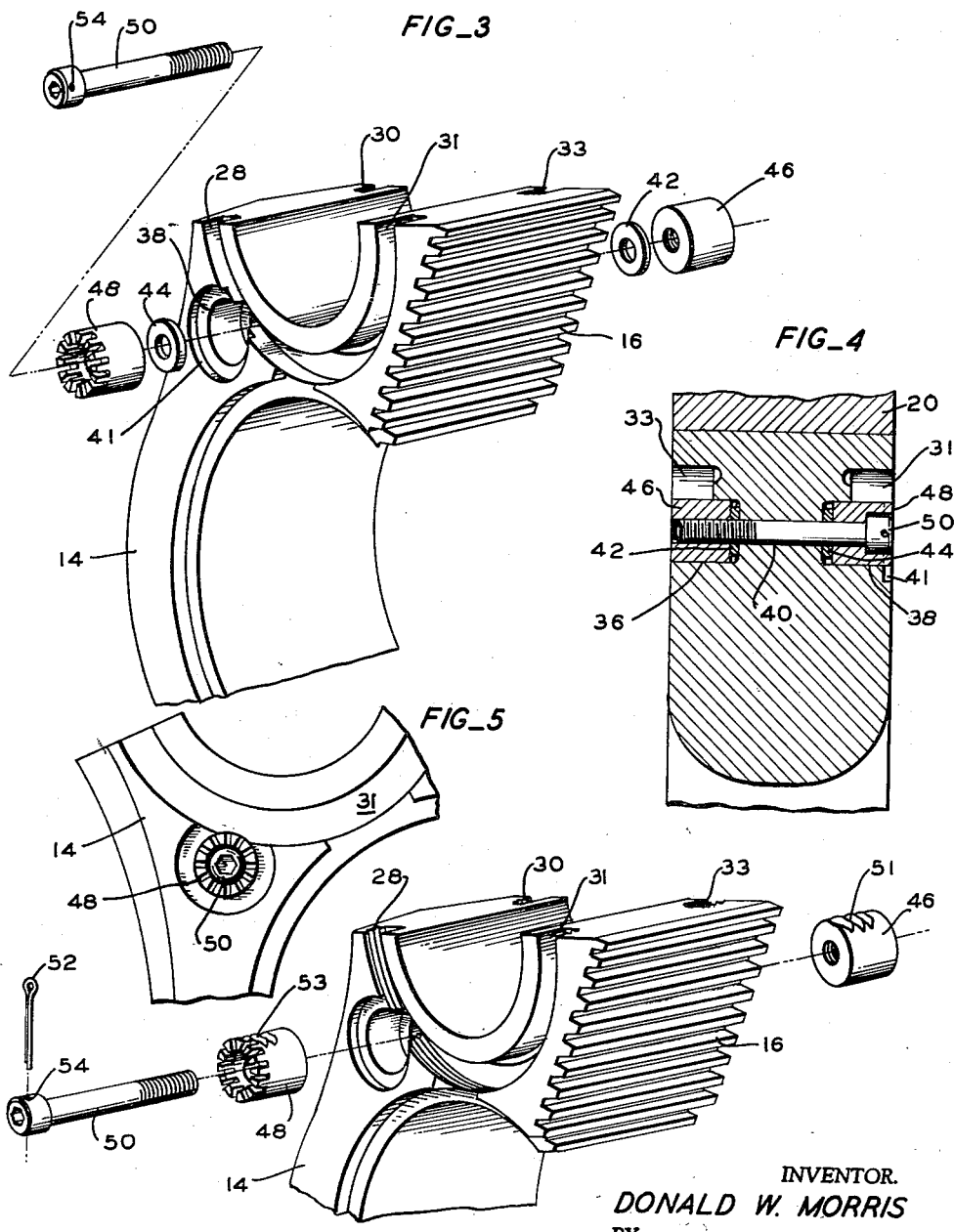

2,939,339

LOCKING MEANS FOR ARTICULATING PORTION OF MASTER AND LINK CONNECTING ROD SYSTEM

Donald W. Morris, Berkeley, Calif., assignor to The Enterprise Division of General Metals Corporation, San Francisco, Calif., a corporation of California Filed Sept. 23, 1957, Ser. No. 685,645

5 Claims. (Cl. 74—580)

This invention relates to master and link connecting rod systems of V-type internal combustion engines, and more particularly, to locking means insuring a permanent attachment of the link connecting rod to the master rod.

Reference is made here to application, Serial No. 470,311, filed November 22, 1954, now issued as Patent No. 2,815,680, which discloses a novel link connecting rod to master rod attachment and to which the present invention is deemed particularly applicable.

The above identified application discloses a master rod crank pin end composed of two interlocking portions, one of which is integral with the master rod while the other is adapted to provide pivotal support and attachment for the link rod. Said support and attachment are achieved as follows:

A cylindrical bearing member is seated in a semi-cylindrical recess formed in the crank pin end portion and maintained against rotation therein by a dowel pin. The lower end of the link connecting rod, hereafter referred to as the link rod, has integral with it two laterally extending arcuate flanges, the inner surfaces of said flanges being adapted to fit said cylindrical bearing member for pivotal movement thereon. The two outer arcuate surfaces of the two lateral flange extensions are adapted to be slidably engaged by the inner arcuate surfaces of two rings, said rings having their outer arcuate surfaces in threaded engagement with the corresponding walls of two semi-circular grooves formed in the crank pin end. It will be apparent that the bearing member-ring combination will maintain the above-described flanges in a captive condition while allowing pivotal movement about said member. A locking device is necessary, however, to prevent the progressive disengagement of said rings from the crank pin end.

An object of the present invention is to provide an improved locking device which will fulfill the above-mentioned purpose.

Another object of the present invention is to provide such a locking device as stated above, and which will be simple to tighten and to loosen.

A further object of this invention is to provide a locking device having the above-mentioned characteristics and which will also be simple and inexpensive to install.

Other objects and advantages will become apparent from the following description when taken in conjunction with the accompanying drawings in which:

Figure 1 is an elevation of the common link and master rod crank pin end, with locking mechanism in place.

Figure 2 is a section taken along lines 2—2 of Figure 1.

Figure 3 is an exploded perspective view of some elements shown in Figure 1.

Figure 4 is a view similar to Figure 2, but showing some elements in an unfinished state.

Figure 5 is a view in right side elevation of Figure 4.

Figure 6 is an exploded perspective view of the locking device in its finished state.

With reference to the drawings in detail, crank pin end segment 10, integral with master rod 12, engages crank pin end segment 14 in interlocking relation by means of serrations 16 and is maintained in said relation by a plurality of bolts 18. Cylindrical bearing member 20 fits in a semi-cylindrical recess of crank pin end segment 14 and is fixedly maintained therein by means of dowel pin 22. Rings 24 and 26 are in threaded engagement with the outer walls 28 and 30 of two semi-circular grooves 31 and 33 provided within said crank pin end segment 14. Link rod 32 has arcuate flanges 34, said flanges being held captive for limited pivotal movement between rings 24 and 26 and bearing member 20.

For a better understanding of the locking device, Figures 3, 4, 5 and 6 should be considered in sequence. Figure 3 shows crank pin end segment 14 comprising the above-described ring-seating grooves 31 and 33 prior to the threading of walls 28 and 30 of said grooves. At that time, two identical bores 36 and 38 are drilled, said bores partially intersecting walls 28 and 30, as shown, with bore 40 of smaller diameter interconnecting said two larger bores. Bore 38 is provided with counter-bore 41 for a purpose later described. Washers 42 and 44 are placed at the inner ends of said larger bores 36 and 38 prior to the introduction of locking nut 46 into bore 36 and castellated locking plug 48 into bore 38. Cap screw 50 is then inserted through said locking plug to threadably engage locking nut 46 and tightly maintain said locking plug and said locking nut against washers 42 and 44.

The subsequent threading operation of walls 28 and 30 of grooves 31 and 33 also forms thread segments 51 and 53 in nut 46 and plug 48, said nut and plug being in an intersecting relation to walls 28 and 30, as above pointed out.

After the threading operation, cap screw 50, nut 46, plug 48, and washers 42 and 44 are removed. The washers are laid aside and nut 46, plug 48, and cap screw 50 are then replaced in the position of Figure 2. Rings 24 and 26 are then brought into full threaded relation with walls 28 and 30 and with the thread segments 51 and 53 of nut 46 and plug 48. The locking device is then put into operation, to wit, cap screw 50 is strongly tightened, which results in the tight wedging of the thread segments 51 and 53 of nut 46 and plug 48 against the threads of rings 24 and 26 and the locking of said rings against loosening rotative movement. Cap screw 50 is then locked in its final position by cotter pin 52, said cotter pin being inserted through transverse aperture 54 and the two crenels of said castellated locking plug which happen to be in alignment with aperture 54. The appropriate space for the placing of said cotter pin is provided by counter-bore 41.

In the claims appended hereto, terms such as "first threaded member," "second threaded member," and "third threaded member," or "threaded section," are employed. These terms have their antecedent basis in (1) one of the rings 24 and 26, (2) crank pin end segment 14, and (3) to one of the partially threaded plugs 46 and 48, although this is not necessarily true in the respective order in which they are referred to in this paragraph.

What is claimed is:

1. For a V-type engine crank pin end having two opposed generally parallel crank pin end faces and operative to fixedly encompass a crank pin, said crank pin end comprising a link rod attachment, said attachment including a partial cylindrical recess provided to seat a cylindrical sleeve member in a parallel relation to said pin, said attachment further comprising two identical arcuate grooves coaxial with said sleeve member and adapted within the two parallel crank pin end faces to seat and threadably engage two parallel ring means; the sub-combination of a locking device operative to lock each of said ring means in threaded relation with said crank pin end and comprising an independent plug-like member adapted to be brought at least partially into threaded engagement with said ring means concurrently with the engagement of said ring means with said crank pin end, means to urge said independent member into a locking position where the threads thereof will be in a wedged relation with respect to the threads of said ring means and means to maintain said independent member in said locking position.

2. For a V-type engine crank pin end having two opposed generally parallel crank pin end faces and operative to fixedly encompass a crank pin, said crank pin end comprising a link rod attachment, said attachment including a partial cylindrical recess provided to seat a cylindrical sleeve member in a parallel relation to said pin, said attachment comprising further two identical arcuate grooves coaxial with said sleeve member and adapted, within the two parallel crank pin end faces to seat and threadably engage two parallel ring means; the sub-combination of a locking device operative to lock each of said two ring means in threaded relation with said crank pin end and comprising two independent plug-like members each of which is adapted to be brought at least partially into threaded engagement with one ring concurrently with the threadable engagement of said ring means with said crank pin end, means to urge said independent members into a position where the threads thereof will be in a wedged relation to the threads of said ring means and means to fix said independent members in said position.

3. The combination set forth in claim 1, including means common to said two independent members for simultaneously urging said members into a ring locking position.

4. A locking device for the securing of two externally threaded rings in locked relation with respect to a pair of spaced apart and parallel internally threaded ring-receiving grooves formed in two opposite faces of a carrier member, said device comprising a bore extending through said carrier member, a bolt extending through said bore, counterbores formed at the ends of said bore, a plug in each of said counterbores, partial thread sections on said plugs, said thread sections being adapted to be in mesh with the threads of said rings, said plugs being movable at least slightly inwardly of said counterbores to wedge said thread sections with the threads of said rings and thereby lock said rings against unthreading movement relative to said grooves, and means to conjointly move said plugs inwardly of said counterbores and to positionally maintain them there comprising a threaded connection between one of said plugs and said bolt and a head formed on said bolt and disposed in engagement with said other plug.

5. The locking device of claim 4 including removable means interconnecting one of said plugs and said bolt for preventing relative rotative movement therebetween.

References Cited in the file of this patent

UNITED STATES PATENTS

| | | |
|---|---|---|
| 770,435 | Lawrence | Sept. 20, 1904 |
| 1,046,139 | Baling | Dec. 3, 1912 |
| 1,086,788 | Schum | Feb. 10, 1914 |
| 1,598,714 | Gray | Sept. 7, 1926 |
| 1,687,917 | Woolson | Oct. 16, 1928 |
| 1,734,244 | Bingham | Nov. 5, 1929 |
| 2,226,819 | Jeffries | Dec. 31, 1940 |
| 2,318,954 | Miller et al. | May 11, 1943 |
| 2,568,478 | Angle | Sept. 18, 1951 |
| 2,608,108 | Knight et al. | Aug. 26, 1952 |
| 2,718,807 | Shepard | Sept. 27, 1955 |
| 2,815,680 | Morris | Dec. 10, 1957 |

FOREIGN PATENTS

| | | |
|---|---|---|
| 95,345 | Germany | Mar. 3, 1897 |